(12) United States Patent
Marable et al.

(10) Patent No.: US 6,663,374 B1
(45) Date of Patent: Dec. 16, 2003

(54) APPARATUS FOR FORMING AN EXTRUDED ICE CREAM DESSERT WITH INCLUSIONS

(75) Inventors: Alger C. Marable, Antioch, CA (US); Scott B. Backinoff, Pleasanton, CA (US)

(73) Assignee: Dreyer's Grand Ice Cream, Inc., DE (US)

( * ) Notice: Subject to any disclaimer, the term of this patent is extended or adjusted under 35 U.S.C. 154(b) by 0 days.

(21) Appl. No.: 10/213,212

(22) Filed: Aug. 6, 2002

(51) Int. Cl.[7] .............................. A23G 7/00; A23P 1/00
(52) U.S. Cl. ................. 425/131.1; 425/315; 425/382.4; 426/515
(58) Field of Search .......................... 425/131.1, 133.1, 425/308, 315, 382.4, 126.2; 426/101, 515, 524

(56) References Cited

U.S. PATENT DOCUMENTS

| | | |
|---|---|---|
| 2,246,871 A | 6/1941 | Blach |
| 2,856,868 A | 10/1958 | Kennedy |
| 2,866,420 A | 12/1958 | Nutty |
| 3,294,692 A | 12/1966 | Kelly et al. |
| 3,547,682 A | 12/1970 | Erb |
| 3,840,311 A | 10/1974 | Wight |
| 3,971,853 A | 7/1976 | Crowder |
| 3,974,300 A | 8/1976 | Roberts et al. |
| 4,268,532 A | 5/1981 | Bernard |
| 4,288,463 A | 9/1981 | Groff et al. |
| 4,340,994 A | 7/1982 | dos Santos et al. |
| 4,504,511 A | 3/1985 | Binley |
| 4,666,723 A | 5/1987 | Invernizzi et al. |
| 4,758,143 A | 7/1988 | Lopes |
| 4,786,243 A | 11/1988 | Kehoe |
| 4,835,000 A | 5/1989 | Kehoe |
| 4,859,165 A | 8/1989 | Hoashi |
| 4,873,104 A | 10/1989 | Butcher et al. |
| 4,882,185 A | 11/1989 | Simelunas et al. |
| 4,925,380 A | 5/1990 | Meisner |
| 4,925,689 A | 5/1990 | Getman |
| 4,971,816 A | 11/1990 | Clark et al. |
| 4,986,080 A | 1/1991 | Grigoli et al. |
| 5,017,390 A | 5/1991 | Sawant |
| 5,100,685 A | 3/1992 | Belshaw et al. |
| 5,102,672 A | 4/1992 | Vos |
| 5,112,626 A | 5/1992 | Huang et al. |
| 5,171,599 A | 12/1992 | Weber |
| 5,198,239 A | 3/1993 | Beavers |
| 5,209,156 A | 5/1993 | Lombard |
| 5,283,070 A | 2/1994 | Bertrand et al. |
| 5,378,483 A | 1/1995 | Fazio et al. |
| 5,415,534 A | 5/1995 | Bertrand et al. |
| 5,425,958 A | 6/1995 | Fazio et al. |
| 5,639,485 A * | 6/1997 | Weinstein et al. ........ 425/131.1 |
| 5,888,567 A | 3/1999 | Daouse |
| 6,350,483 B1 | 2/2002 | Ahad et al. |

* cited by examiner

Primary Examiner—George C. Yeung
(74) Attorney, Agent, or Firm—Townsend and Townsend and Crew LLP

(57) ABSTRACT

An apparatus for forming an extruded ice cream bar with variegated inclusions. The apparatus includes a main die having a section with sidewalls extending between upper and lower end portions and defining a cavity. In the preferred embodiment, a plurality of intermediate dies for insertion of the inclusions are positioned within the cavity and spaced from the sidewalls of the main die. The intermediate dies gradually and progressively change in cross-sectional shape from being round at the top to the desired shape of the inclusion at the bottom. As the ice cream flows through the cavity of the main die, it passes along and about the intermediate dies through which the inclusions are flowing. Each intermediate die is preferably fed by two tubes so that the final shape of the inclusion at the bottom of the intermediate die is fully and evenly filed. The intermediate dies are preferably made of heat conductive, metallic material wherein the surrounding ice cream in the main die will gradually and progressively cool the hotter inclusions in the intermediate dies before they reach the insertion locations.

33 Claims, 5 Drawing Sheets

US 6,663,374 B1

APPARATUS FOR FORMING AN EXTRUDED ICE CREAM DESSERT WITH INCLUSIONS

BACKGROUND OF THE INVENTION

1. Field of the Invention

This invention relates to the field of extruded ice cream desserts and more particularly to the field of such extruded desserts with inclusions or variegated ingredients in them.

2. Discussion of the Background

Ice cream bars and similar desserts with additions or inclusions (e.g., fudge, caramel, chocolate, syrup, and dough) are becoming more popular. Such bars essentially consist of a primary ingredient such as ice cream into which distinct segments of a variegate or second ingredient have been inserted. The additional ingredient or inclusion can be a second kind/color of ice cream or a completely different material such as those mentioned above. The inclusions are preferably not mixed with the ice cream but rather inserted into it in distinct patterns such as in U.S. Pat. Nos. 3,840,311; 5,378,483; and 5,425,958. U.S. Pat. No. 3,840,311 in this regard inserts a second ice cream to form the shape of the eyes and mouth of a face (see its FIG. 2). The other two patents add a hotter, thicker dough as distinct, side segments in their FIG. 3.

The process to add the second ingredient or inclusion into the ice cream can actually be quite involved, particularly if the inclusion has different properties (e.g., viscosity, temperature) from those of the primary ice cream. In doing so, it is important that the delivery of the inclusion or inclusions into the main flow of the ice cream be carefully coordinated. It is also important that the inclusions evenly and fully fill up the desired shapes of the inserting nozzles or dies (e.g., see again the eyes and mouth of FIG. 3 of U.S. Pat. No. 3,840,311). Otherwise the inclusions will not have a neat appearance (e.g., the face in U.S. Pat. No. 3,830,311). Additionally, if there are any voids in the inserted inclusions, the extrusion may be difficult to cut in a smooth and neat manner. Further, the outer ice cream may collapse into the voids giving the outer, overall shape of the bar or other dessert an undesirable appearance.

With this and other problems in mind, the present invention was developed. With it, an apparatus is provided that fully and evenly inserts the inclusions into the ice cream. Additionally, the apparatus serves to gradually and progressively cool the inclusions (which normally are handled and delivered at a higher temperature than the ice cream) to substantially the same temperature as the ice cream for a neater insertion and a subsequent neater cut.

SUMMARY OF THE INVENTION

This invention involves an apparatus for making an ice cream bar or similar extrusion with variegated inclusions in it. The apparatus includes a main die having a section with sidewalls extending between upper and lower end portions and defining a cavity. In the preferred embodiment, a plurality of intermediate dies for insertion of the inclusions are positioned within the cavity of the main die spaced from the sidewalls thereof.

In use, ice cream or other primary ingredient is delivered into the cavity of the main die to flow along an axis from its upper end portion to its lower end portion. The ice cream is then extruded through the exit of the lower end portion and cut into bars. As the ice cream flows through the cavity of the main die, it passes along and about the intermediate dies through which the inclusions are flowing. The intermediate dies gradually and progressively change in cross-sectional shape from being round at the top to the desired shape of the inclusion at the bottom (e.g., narrow and elongated).

The gradual and progressive change in the shape of the intermediate dies allows the ice cream flowing past them to fully conform to the desired shape of the inclusion. Additionally, each intermediate die is preferably fed by two tubes so that the final shape of the inclusion (e.g., narrow and elongated) at the bottom of the intermediate die is fully and evenly filed. Further, the intermediate dies are preferably made of heat conductive, metallic material (e.g., stainless steel). In this manner, the inclusions (which are normally handled and delivered at a higher temperature than the ice cream) are gradually and progressively cooled to substantially the same temperature as the ice cream at the insertion location. The result is then a neater insertion and a subsequent neater cut of the extrusion.

BRIEF DESCRIPTION OF THE DRAWINGS

FIG. 10 is a view taken along line 10—10 of FIG. 5 and generally along lines 10—10 of FIG. 7.

DETAILED DESCRIPTION OF THE INVENTION

Figure 1:
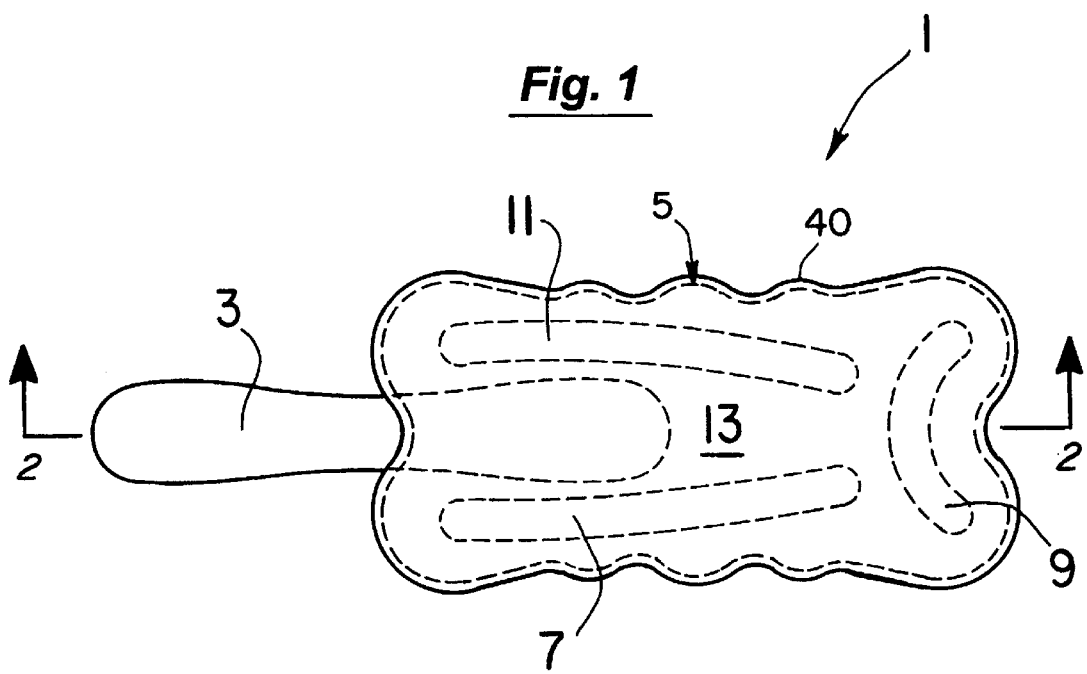
FIG. 1 is a top plan view of a dessert bar made with the apparatus of the present invention.
Figure 2:
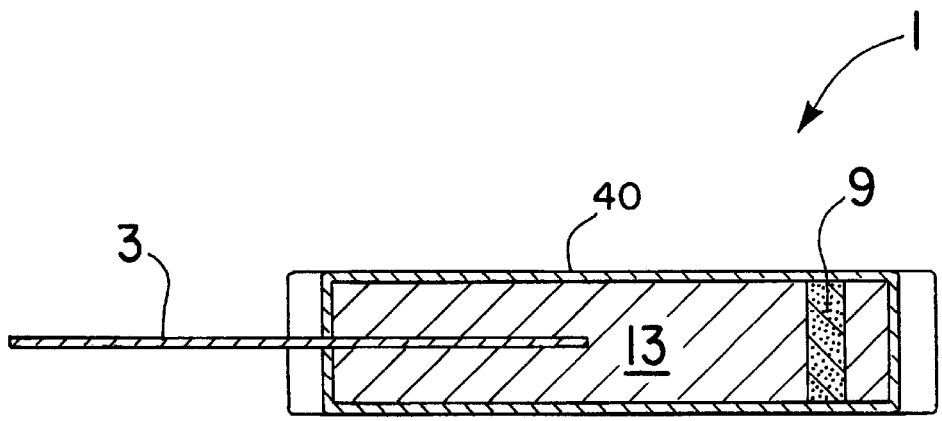
FIG. 2 is a cross-sectional view of the dessert bar taken along line 2—2 of FIG. 1.

FIGS. 1–2 illustrate a dessert bar 1 made with the apparatus of the present invention. As shown, the dessert bar 1 is mounted on a stick 3 and has a distinctive peripheral shape 5. Additionally, the dessert bar 1 has inclusions or variegates 7, 9, and 11 in the ice cream 13 or similar ingredient making up the primary content or material of the dessert bar 1. The inclusions 7, 9, and 11 can be ice cream of a different color or texture but are preferably additions like fudge or caramel. Normally, such inclusions as fudge and caramel have sufficiently different viscosities and other properties from those of the ice cream 13 that they have to be handled and delivered to the assembling apparatus at higher temperatures (e.g., 45° F.) than the ice cream (e.g., 20° F.–25° F.). This creates unique problems as wide diversions in the temperatures of the inclusions and ice cream at the point of insertion into each other can detract from the overall appearance and quality of the dessert bar 1.

For example, the hotter inclusion may undesirably melt the surrounding ice cream and cause the distinct lines and shapes of the inclusions 7, 9, and 11 in FIG. 1 to smear and run into the ice cream 13. Voids may also appear in the shapes of the inclusions 7, 9, and 11 and the overall strength of the dessert bar 1 may be reduced. Such voids or non-uniform filling of the shapes of the inclusions 7, 9, and 11 (particularly if the shapes are somewhat narrow or elaborate) can also occur simply because the shape of the die inserting the inclusion is not completely and evenly filled. With the present invention, these and other problems are addressed.

Figures 3, 4:
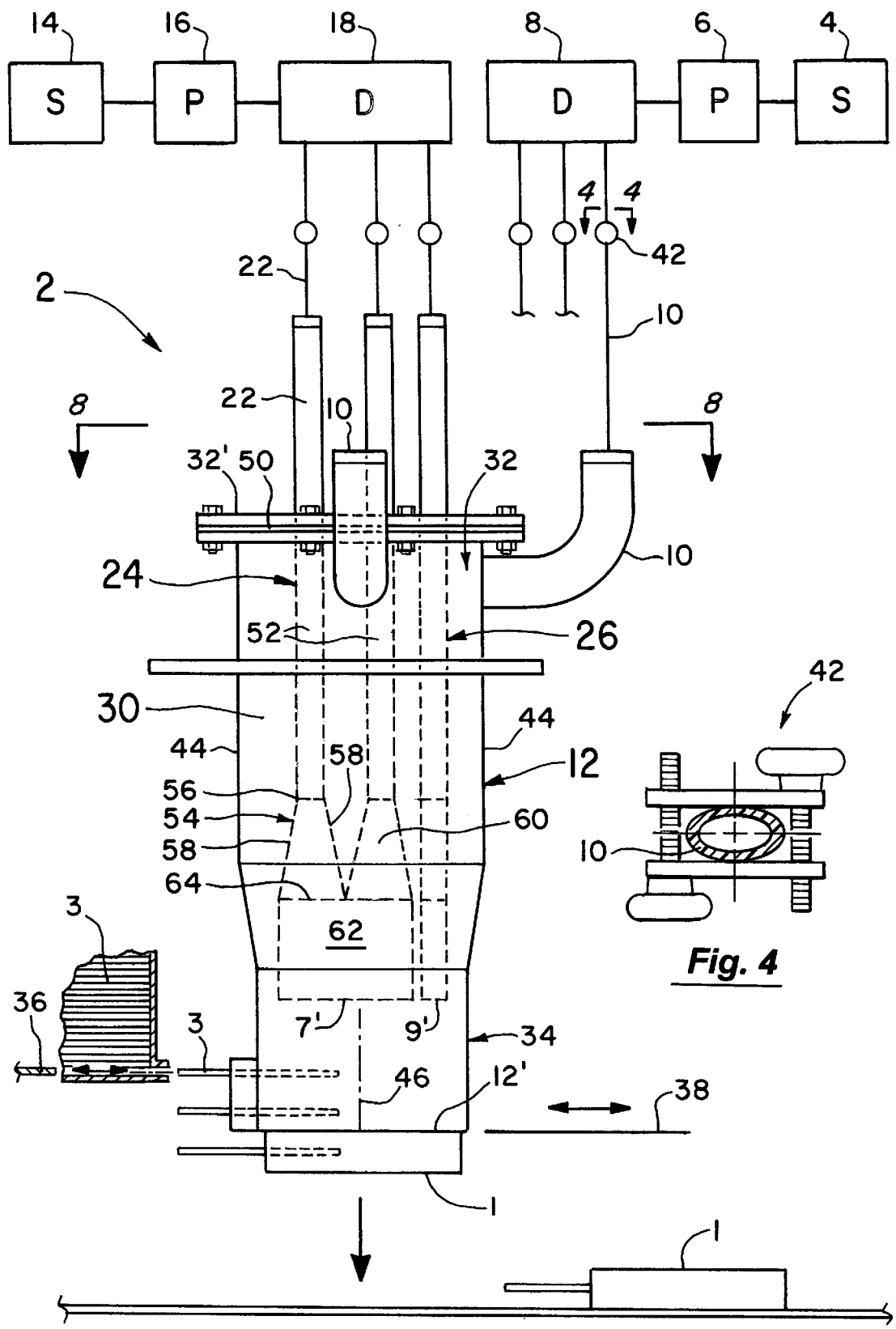
FIG. 3 is a side view of the apparatus of the present invention.
FIG. 4 is a view taken along line 4—4 of FIG. 3.

Referring to FIG. 3 and with the apparatus 2 of the present invention, the dessert bar 1 of FIGS. 1–2 can be easily and efficiently created. As shown in FIG. 3, the ice cream is fed from a supply source 4 through a pump 6 (e.g., positive displacement pump) and distributor 8 to one or more feed lines 10 and into the main die 12. Similarly but separately, the inclusion ingredient (e.g., fudge or caramel) is fed from a second supply source 14 through a pump 16 and distributor 18 to feed lines 22 and into the intermediate dies 24 and 26 positioned in the cavity 30 of the main die 12. The semi-frozen ice cream then flows from the upper or first end portion 32 of the main die 12 past and about the intermediate dies 24 and 26. The inclusions 7 and 9 from intermediate dies 24 and 26 are inserted into the flowing ice cream 13 at insertion locations 7' and 9'. The ice cream with the inserted inclusions 7 and 9 then flows to the lower or second end portion 34 of the main die 12 where it is extruded out of the lower end portion 34 at exit 12'. If desired, a stick such as 3 can be inserted into the extrusion by plunger 36 or other means as schematically shown in FIG. 3. The extrusion can also be cut at 38 as schematically shown in FIG. 3 to create the individual dessert bars 1. The cut dessert bars 1 can then be conveyed if desired to additional processing stages to be frozen and subsequently coated (e.g., with chocolate layer 40 of FIGS. 1–2).

The entire operation of the extrusion apparatus 2 is preferably timed to run continuously (e.g., producing 120–150 dessert bars 1 a minute). In this regard, the upper sections of the feed lines 10 and 22 in FIG. 3 are preferably flexible wherein their flow rates and volumes can be set and controlled by simple mechanisms such as the pinch valve 42 illustrated in FIG. 4. At the lower sections adjacent the main die 12 and intermediate dies 24 and 26, the feed lines 10 and 22 are preferably rigid and metallic.

Figure 5:
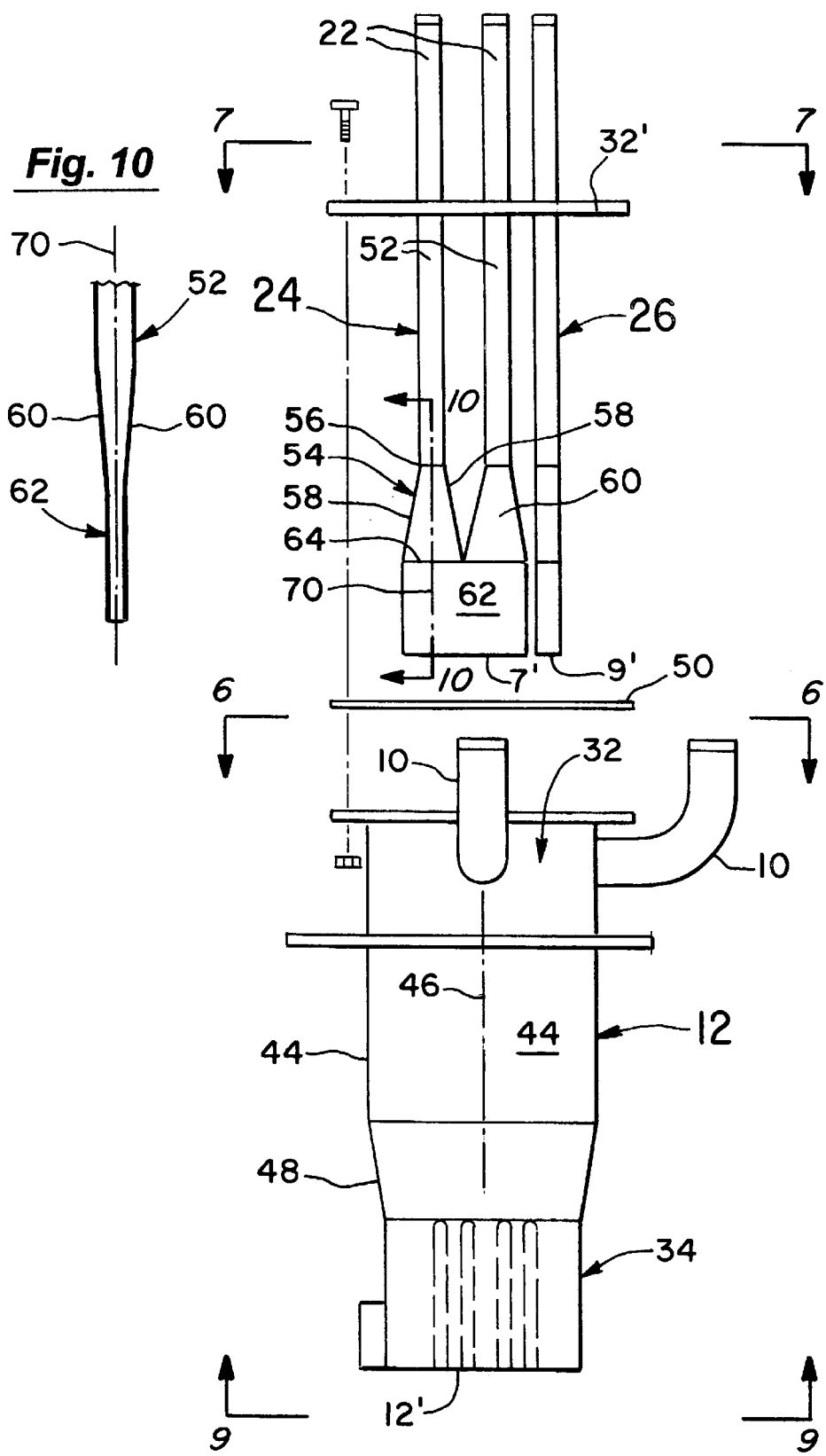
FIG. 5 is an exploded view of the main die and intermediate dies of the present invention.
Figure 6:
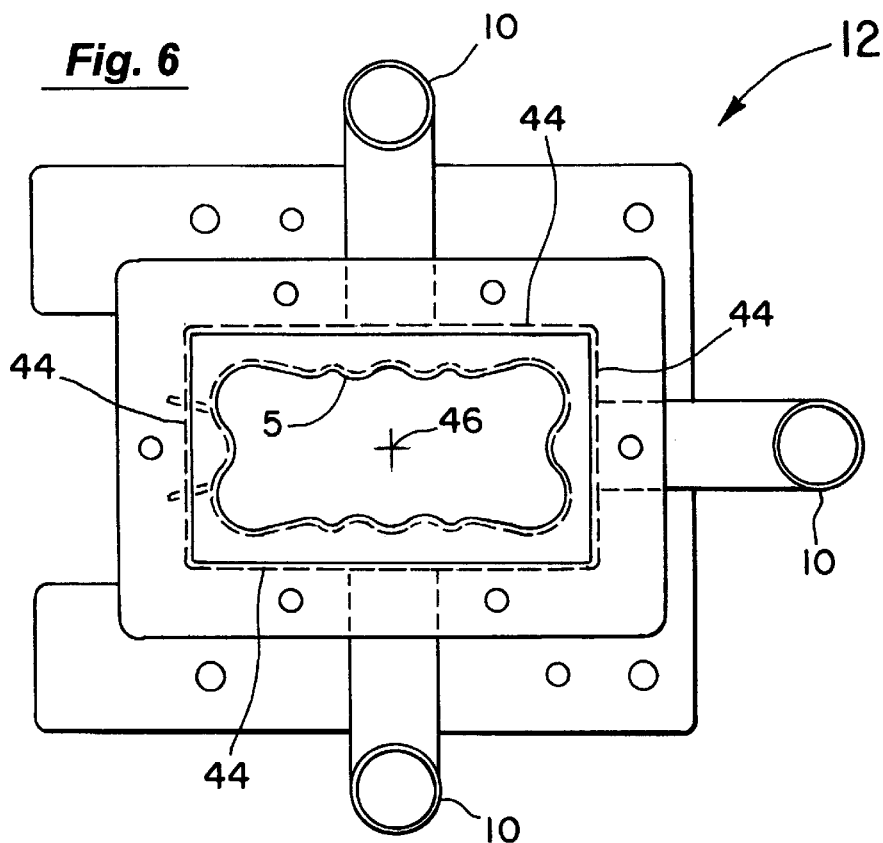
FIG. 6 is a view of the main die taken along line 6—6 of FIG. 5.

Referring again to FIG. 3 and also to FIG. 5, the main die 12 has a section of sidewalls 44 (see FIG. 5) extending along and about the axis 46 between the upper and lower end portions 32 and 34 thereof. The sidewalls 44 can form any cross-sectional shape but preferably form a substantially rectangular shape at the upper end portion 32 (see also FIG. 6). The sidewalls 44 then taper down at 48 (see FIG. 5) to the lower end portion 34. The lower end portion 34 along the entire length thereof from 48 to the exit 12' preferably has the desired peripheral shape 5 (see FIG. 6) of the dessert bar 1. The upper end portion 32 of the main die 12 is preferably closed by the end member or plate 32' (see FIGS. 3 and 5) and sealed about the end portion 32 by gasket 50. The feed lines 22 preferably pass through the end member 32' to feed the top sections 52 of the respective intermediate dies 24 and 26 within the cavity 30 of the main die 12 (see FIG. 3).

The intermediate dies 24 and 26 are positioned as shown in FIG. 3 within the cavity 30 of the main die 12 and spaced from the sidewalls 44 of the main die 12. In this manner, the ice cream will flow not only along but also completely about each intermediate die 24 and 26. In the embodiment of FIG. 3, the intermediate dies 24 and 26 are actually part of and suspended from the plate 32' into the cavity 30 of the main die 12 (see also FIG. 5). In the illustrated embodiment, the ice cream is fed through three of the four side walls 44 of the main die 12 by three, separate lines 10 (see FIGS. 3 and 6).

It is noted there is also a third intermediate die behind and substantially identical to 24 illustrated in FIGS. 3 and 5. This third intermediate die then fills the shape of the third inclusion 11 of the dessert bar 1 in FIG. 1.

Both of the intermediate dies 24 and the intermediate die 26 have substantially the same shape. However, the intermediate die 26 is approximately half the size of the other intermediate dies 24 as the intermediate die 26 fills the smaller inclusion shape 9 (see FIG. 1). As best seen in FIG. 3 and referring to the illustrated intermediate die 24, the inclusion ingredient is first fed into the two, top sections 52 of the intermediate die 24 positioned within the cavity 30 of the main die 12. Top sections 52 preferably have substantially round, inner and outer cross sections and are substantially cylindrical. The top sections 52 receive the inclusion ingredient preferably in a direction substantially parallel to the axis 46 of the main die 12. Each of the top sections 52 in FIG. 3 then feeds into a middle section 54 at a first location or confluence 56 upstream of the insertion location 7'. Each middle section 54 in turn feeds into approximately half of the cross-sectional shape of the common bottom section 62 at a second location 64 upstream of but closer to the exit 7'. As shown and explained in more detail below, each middle section 54 has a first pair of diverging sidewalls 58 from the first location 56 to the second location 64 giving each of the joining pair of sidewalls 60 an overall fan or truncated triangular shape.

Figure 7:
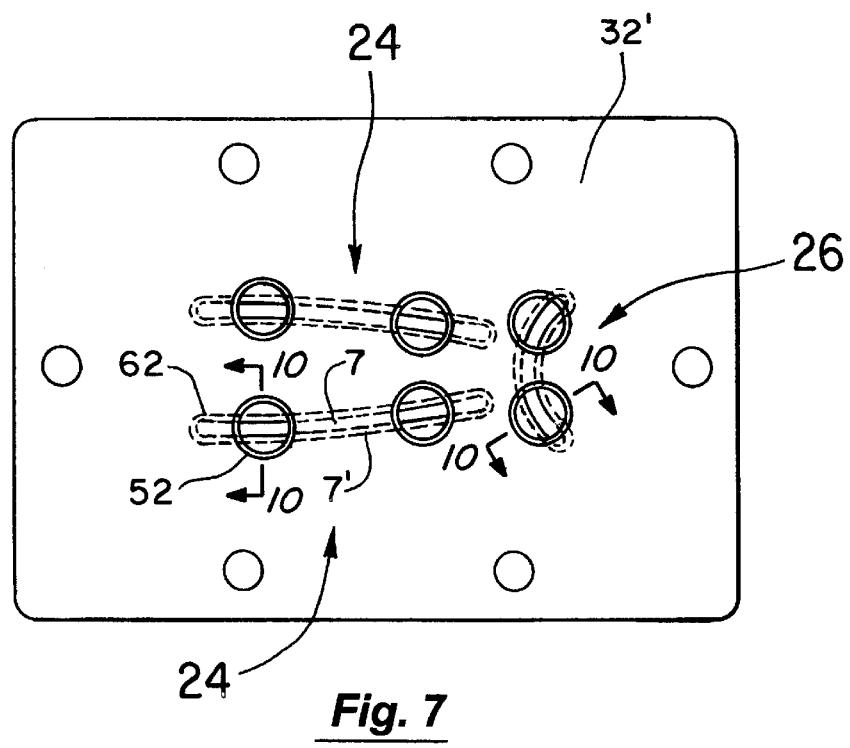
FIG. 7 is a view of the intermediate dies taken along line 7—7 of FIG. 5.

The twin arrangements in FIGS. 3 and 5 of the two, spaced-apart, top sections 52 and two, spaced-apart, middle sections 54 of the intermediate die 24 have been found to have multiple advantages. First, the twin or plural delivery of the inclusion ingredient through the top sections 52 and the fanning middle sections 54 greatly aids in spreading the inclusion ingredient to fully and evenly fill the narrow, elongated shape of the bottom section 62. As discussed above, if there are voids in the fill of the inclusion ingredient such as 7 or the fill is not uniform, the appearance and strength of the resulting dessert bar 1 may be compromised. A second advantage is that the gradual and progressive conversion of the shape of the intermediate die 24 from the round, outer cross sections of the top sections 52 (see FIGS. 5 and 7) to the narrow, elongated shape 7 at the insertion location 7' of the bottom section 62 permits the ice cream passing along and about the intermediate die 24 to be neatly cavitated. That is, the substantially laminar flow of the ice cream through the main die 12 of FIG. 3 can easily pass by and conform to the final shape of the intermediate die 24 at the insertion location 7'. A very neat cavity with a fairly clean perimeter is then presented to be filled by the inclusion ingredient 7 in the intermediate die 24.

A third advantage of the gradual and progressive conversion of the shape of the intermediate die 24 is derived from the intermediate die 24 preferably being made of a heat conductive, metallic material such as stainless steel. In this regard, inclusions such as fudge and caramel typically have higher viscosities than the semi-frozen ice cream and are easier to handle and deliver to the intermediate die 24 if the temperature of the inclusion is elevated, thereby lowering its viscosity. With the cooling feature of the present invention, this is possible as the inclusion can be handled and delivered to the top sections 52 of the intermediate die 24 at temperatures (e.g., 35° F.–45° F. for fudge or caramel) higher than those of the ice cream (e.g., 20° F.–25° F.). Thereafter, the gradual and progressive changing of the outer shape of the intermediate die 24 in the cavity 30 of the main die 12 serves to present more surface area to the cooler ice cream passing along and about the intermediate die 24. The inclusion initially fed to the top sections 52 of the intermediate die 24 at an elevated temperature for ease of handling can then be efficiently and gradually cooled to or at least close to the temperature of the ice cream before being inserted into the ice cream at the insertion location 7'. In this regard, the closer the two temperatures can be at insertion, the less likely the inclusion ingredient will melt the surrounding ice cream and cause the distinct lines and shapes of the inclusions to smear and run into the ice cream.

The flow rate and volume of inclusion ingredient 7 through each of the top sections 52 of the intermediate die 24 are preferably the same. As illustrated in FIG. 5, the width of each middle section 54 at the confluence 64 with the respective half of the bottom section 62 is about twice that of the width of each top section 52 and middle section 54 at confluence 56. Similarly, the width of the intermediate die at the insertion location 7' is then about four times the width of the confluence 56 between each top section 52 and middle section 54. These last relative dimensions of the widths of the top sections 52 and bottom section 62 at the insertion location 7' can also be seen in the top plan view of FIG. 7. These widths in the reference of FIG. 3 are taken in directions substantially perpendicular to the axis 46 of the main die 12.

The total length of the main die 12 in the illustrated embodiment of FIG. 3 is about 12 inches with the tapering portion 48 being about 2 inches of this total and the substantially straight end portion 34 being about 3.5 inches. The width of the main die 24 at the upper end portion 32 is about 5 inches tapering at 48 down to about 4.5 inches at the lower end portion 34 and exit 12'. To effectively and efficiently accomplish the gradual and progressive cooling of the inclusion ingredient in the intermediate die 24 in the scale of FIG. 3, each top section 52 extends about 6 inches down from the end plate 32' with the respective middle sections 54 and bottom section 62 each extending about the same distance of 2 inches. The outer, cross-sectional shape of the exit 7' for the inclusion 7 (see FIG. 7) is approximately 3.25 inches long and 0.25 inches wide. The inner, cross-sectional shape of the inclusion 7 itself is about 3 inches long and 0.125 inches wide. The wall thicknesses are then about 0.0625 inches each, which wall thickness is substantially maintained throughout the entire length of the intermediate die 24 from the top sections 52 to the exit 7'.

The sidewalls 58 of each middle section 54 in the intermediate die 24 in FIG. 5 extend away from the common, central axis 70 at about 10 degrees but can be anywhere between about 5 and 20 degrees or slightly more. It is also noted as best seen in FIG. 10 which is taken along line 10—10 of FIG. 5 that the other pair of sidewalls 60 of the middle section 54 joined to the sidewalls 58 preferably taper toward each other and toward the common, central axis 70 at about 5 degrees. The intermediate die 26 for the inclusion 9 in this regard has sidewalls corresponding to sidewalls 58 of the intermediate die 24 but extending away from a common axis at about 5 degrees. Similarly, the sidewalls of intermediate die 26 corresponding to sidewalls 60 taper toward the common axis at about 5 degrees as the widths of the inclusions 7, 9, and 11 in the illustrated embodiments are substantially the same.

Figure 8:
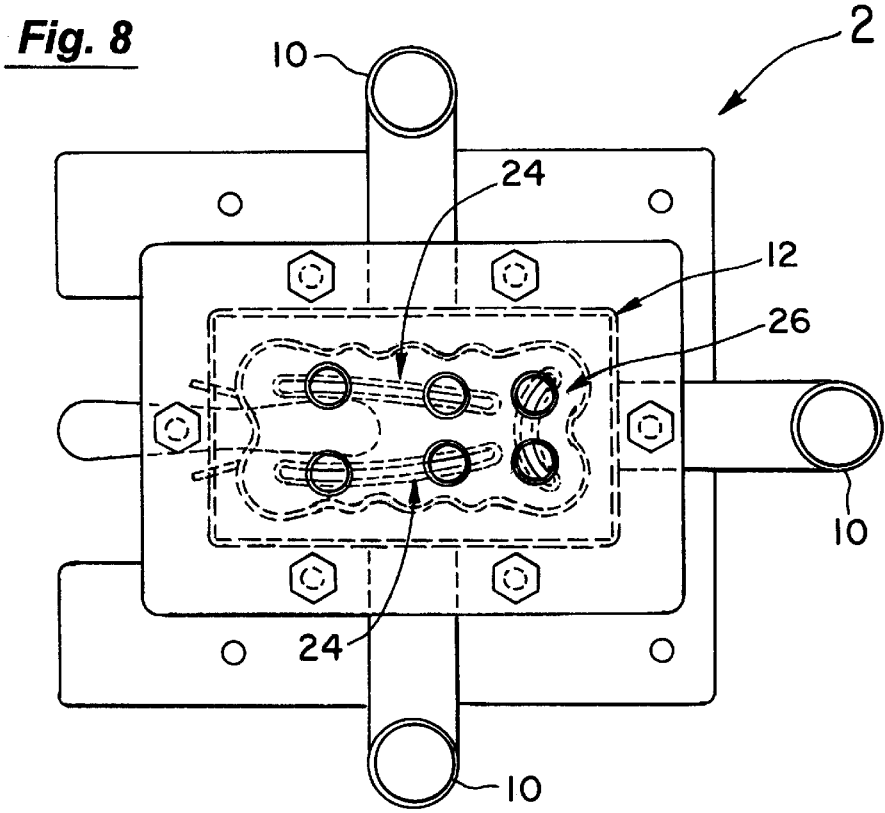
FIG. 8 is a top plan view combining the views of FIGS. 6 and 7.
Figure 9:
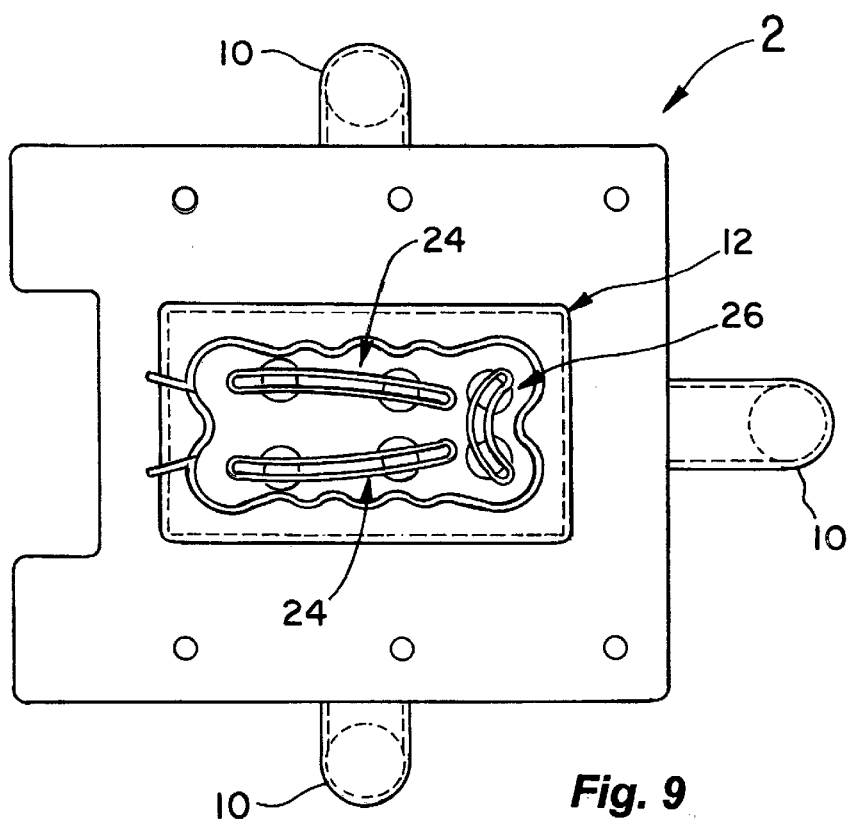
FIG. 9 is a bottom plan view taken along line 9—9 of FIG. 5 showing the relative positioning of the assembled dies of the present invention.

Referring again to FIGS. 6 and 7, these are top plan views of the main die 12 of FIG. 5 and the intermediate dies 24 and 26. The assembled dies 12, 24, and 26 are then shown in FIG. 8 taken along line 8—8 of FIG. 3 and combining the views of FIGS. 6 and 7. FIG. 9 is a bottom plan view taken along line 9—9 of FIG. 5 also showing the relative positioning of the assembled dies 12, 24, and 26.

While several embodiments of the present invention have been shown and described in detail, it to be understood that various changes and modifications could be made without departing from the scope of the invention.

We claim:

1. An apparatus (2) for forming an extruded dessert of a primary ingredient such as ice cream and an inclusion ingredient such as fudge, said apparatus including:

a main die (12) having a section with sidewalls (44) extending along and about a first axis (46) between first and second end portions (32,34), said sidewalls between said first and second end portions defining a cavity (30), at least one supply source (4) to feed said primary ingredient into the cavity of said main die substantially adjacent the first end portion thereof, said primary ingredient flowing through the cavity of the main die from adjacent the first end portion to the second end portion to be extruded outwardly of the main die from the second end portion thereof, said second end portion having an exit (12') defining a peripheral shape about the first axis and said extruded primary ingredient assuming the peripheral shape of said exit, said apparatus further including at least one intermediate die (24) positioned within the cavity of the main die and spaced from the sidewalls thereof to receive said inclusion ingredient such as fudge and insert said inclusion ingredient into the primary ingredient as said primary ingredient flows along the cavity of the main die along and about said intermediate die, said inclusion ingredient being inserted into said primary ingredient at an insertion location (7') adjacent the exit (12') of the second end portion (34) of the main die (12), at least a second supply source (14) to feed said inclusion ingredient into the intermediate die, said intermediate die having at least two, spaced-apart, top sections (52) and two, spaced-apart, middle sections (54), said intermediate die further including a common bottom section (62), said top sections receiving said inclusion ingredient from said second supply source and respectively extending from adjacent the first end portion of the main die to respective first locations (56) upstream of the insertion location (7'), said respective middle sections (54) extending from said respective first locations (56) to respective second locations (64) upstream of said insertion location (7'), said common bottom section (62) extending from said respective second locations (64) to said insertion location (7'), each of said top sections (52) of the intermediate die (24) having a first, inner, cross-sectional shape and said common bottom section (62) having an inner, cross-sectional shape different from said first shape, each of said middle sections (54) having an inner, cross-sectional shape gradually and progressively changing from substantially matching said first shape of said top section (52) to substantially matching at least a portion of the shape of the common bottom section (62).

2. The apparatus of claim 1 wherein each portion of the shape of the common bottom section is substantially half of the entire shape thereof wherein said two, top sections and said two, middle sections together direct the inclusion ingredient therein into the entire, cross-sectional shape of the bottom section.

3. The apparatus of claim 1 wherein said bottom section of the intermediate die has substantially the same cross-sectional shape from said second location to said insertion location.

4. The apparatus of claim 1 wherein the cross-sectional shape of each of the top sections is substantially round and the cross-sectional shape of the common bottom section is substantially narrow and elongated.

5. The apparatus of claim 1 wherein each of said middle sections has at least a first pair of sidewalls gradually and progressively extending away from each other from the first location to the second location.

6. The apparatus of claim 5 wherein said first pair of sidewalls of each of said middle sections extend away from a common, central axis at an angle between about 5 degrees and 20 degrees.

7. The apparatus of claim 6 wherein said angle is about 10 degrees.

8. The apparatus of claim 5 wherein each of said middle sections has a second pair of sidewalls joined to said first pair, each sidewall of said second pair having a generally fan shape.

9. The apparatus of claim 5 wherein each of said middle sections has a second pair of sidewalls joined to said first pair, each sidewall of said second pair having a generally truncated triangular shape.

10. The apparatus of claim 5 wherein each of said middle sections has a second pair of sidewalls joined to said first pair, the sidewalls of said second pair gradually and progressively extending toward each other from said first location to the second location.

11. The apparatus of claim 10 wherein said second pair of sidewalls extend toward each other at an angle to said common, central axis of about 5 degrees.

12. The apparatus of claim 5 wherein said second supply source feeds the inclusion ingredient into said intermediate die at a temperature higher than the temperature the primary ingredient is being fed into said main die and at least said middle sections of said intermediate dieare made of heat conductive, metallic material wherein the higher temperature inclusion ingredient flowing through the intermediate die is gradually and progressively cooled by the lower temperature primary ingredient flowing along and about the middle sections of the intermediate die.

13. The apparatus of claim 12 wherein said top and bottom sections are made of heat conductive, metallic material.

14. The apparatus of claim 5 wherein the cross-sectional shape of each of the middle sections at said first location extends in a direction substantially perpendicular to said first axis for a first distance and the cross-sectional shape at said second location is substantially twice said first distance.

15. The apparatus of claim 5 wherein the distance along said first axis between the first and second locations of each of said middle sections is substantially the same distance as the distance between said second location and the insertion location of said bottom section.

16. The apparatus of claim 1 wherein said insertion location of the inclusion ingredient is upstream of the exit of the second end portion of the main die.

17. The apparatus of claim 1 further including an end member positioned to close the first end portion of the main die, said intermediate die being fed said inclusion ingredient from said second supply source through said end member.

18. The apparatus of claim 1 wherein said intermediate die is fed said inclusion ingredient from said second supply source in a direction substantially parallel to said first axis.

19. An apparatus (2) for forming an extruded dessert of a primary ingredient such as ice cream and an inclusion ingredient such as fudge, said apparatus including:

a main die (12) having a section with sidewalls (44) extending along and about a first axis (46) between first and second end portions (32,34), said sidewalls between said first and second end portions defining a cavity (30), at least one supply source (4) to feed said primary ingredient into the cavity of said main die substantially adjacent the first end portion thereof, said primary ingredient flowing through the cavity of the main die from adjacent the first end portion to the second end portion to be extruded outwardly of the main die from the second end portion thereof, said second end portion having an exit (12') defining a peripheral shape about the first axis and said extruded primary ingredient assuming the peripheral shape of said exit, said apparatus further including at least one intermediate die (24) positioned within the cavity of the main die and spaced from the sidewalls thereof to receive said inclusion ingredient such as fudge and insert said inclusion ingredient into the primary ingredient as said primary ingredient flows along the cavity of the main die along and about said intermediate die, said inclusion ingredient being inserted into said primary ingredient at an insertion location (7') adjacent the exit (12') of the second end portion (34) of the main die (12), at least a second supply source (14) to feed said inclusion ingredient into the intermediate die at a temperature higher than the temperature of the primary ingredient being fed into the cavity of the main die by said first supply source, said intermediate die having top, middle, and bottom sections (52,54,62), said top section (52) extending along said first axis (46) from adjacent the first end portion of the main die to a first location (56) upstream of the insert location (7') of the intermediate die, said middle section (54) extending from said first location (56) to a second location (64) upstream of said insertion location (7'), said top section (52) of the intermediate die having a first, outer, cross-sectional shape at said first location (56) and said bottom section (62) having an outer, cross-sectional shape at said second location (64) different from said first shape, said bottom section (62) having substantially the same cross-sectional shape from said second location (64) to said insertion location (7'), said middle section (54) having an outer, cross-sectional shape gradually and progressively changing from substantially matching the first shape at the first location (56) to substantially matching at least a portion of the shape of the bottom section at said second location (64), at least said middle section (54) being made of heat conductive, metallic material wherein the higher temperature inclusion ingredient flowing through the intermediate die (24) is gradually and progressively cooled by the lower temperature primary ingredient flowing along and about the metallic middle section (54) of the intermediate die (24).

20. The apparatus of claim 19 wherein said top and bottom sections of said intermediate die are made of heat conductive, metallic material.

21. The apparatus of claim 19 wherein the cross-sectional shape of said top section of the intermediate die is substantially round and the cross-sectional shape of said bottom section is substantially narrow and elongated.

22. The apparatus of claim 19 wherein said middle section has at least a first pair of sidewalls gradually and progressively extending away from each other from the first location to the second location.

23. The apparatus of claim 22 wherein said first pair of sidewalls of said middle section extend away from a common, central axis at an angle between about 5 degrees and 20 degrees.

24. The apparatus of claim 23 wherein said angle is about 10 degrees.

25. The apparatus of claim 22 wherein said middle section has a second pair of sidewalls joined to said first pair, each sidewall of said second pair having a generally fan shape.

26. The apparatus of claim 22 wherein said middle section has a second pair of sidewalls joined to said first pair, each sidewall of said second pair having a generally truncated triangular shape.

27. The apparatus of claim 22 wherein said middle section has a second pair of sidewalls joined to said first pair, the sidewalls of said second pair gradually and progressively extending toward each other from said first location to the second location.

28. The apparatus of claim 27 wherein said second pair of sidewalls extend toward each other at an angle to said common, central axis of about 5 degrees.

29. The apparatus of claim 22 wherein the cross-sectional shape of the middle section at said first location extends in a direction substantially perpendicular to said first axis for a first distance and the cross-sectional shape at said second location is substantially twice said first distance.

30. The apparatus of claim 22 wherein the distance along said first axis between the first and second locations of said middle section is substantially the same distance as the distance between said second location and the insertion location of said bottom section.

31. The apparatus of claim 19 wherein said insertion location of the inclusion ingredient is upstream of the exit of the second end portion of the main die.

32. The apparatus of claim 19 further including an end member positioned to close the first end portion of the main die, said intermediate die being fed said inclusion ingredient from said second supply source through said end member.

33. The apparatus of claim 19 wherein said intermediate die is fed said inclusion ingredient from said second supply source in a direction substantially parallel to said first axis.

* * * * *